US012425052B2

(12) United States Patent
Guo et al.

(10) Patent No.: US 12,425,052 B2
(45) Date of Patent: Sep. 23, 2025

(54) CONGLOMERATING TRANSMISSION CONTOURS TO IMPROVE TRANSMISSION PERFORMANCE FOR RADIO-FREQUENCY COMMUNICATIONS (71) Applicant: SKYWORKS SOLUTIONS, INC., Irvine, CA (US)

(72) Inventors: Jiunn-Sheng Guo, Eastvale, CA (US); Tianming Chen, Newbury Park, CA (US); Russ Alan Reisner, Oxnard, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 428 days.

(21) Appl. No.: 17/566,349

(22) Filed: Dec. 30, 2021

(65) Prior Publication Data
US 2022/0255567 A1    Aug. 11, 2022

Related U.S. Application Data (60) Provisional application No. 63/281,365, filed on Nov. 19, 2021, provisional application No. 63/133,196, filed on Dec. 31, 2020.

(51) Int. Cl.
H04L 12/00    (2006.01)
H04B 1/00     (2006.01)
H04B 1/48     (2006.01)

(52) U.S. Cl.
CPC ............. H04B 1/0057 (2013.01); H04B 1/48 (2013.01)

(58) Field of Classification Search
CPC .............................. H04B 1/0057; H04B 1/48
See application file for complete search history.

(56) References Cited

U.S. PATENT DOCUMENTS

| 8,670,797 | B2 | 3/2014 | Asuri et al. |
| 10,103,754 | B2 | 10/2018 | King |
| 10,404,219 | B2 | 9/2019 | Wallis |
| 2009/0180403 | A1 | 7/2009 | Tudosoiu |

(Continued)

FOREIGN PATENT DOCUMENTS

KR    10-2017-0012275 A    2/2017

OTHER PUBLICATIONS

Written Opinion of the International Searching Authority for PCT/US2021/065769, Apr. 27, 2022, in 4 pages.

(Continued)

Primary Examiner — Noel R Beharry
Assistant Examiner — Lionel Preval
(74) Attorney, Agent, or Firm — Chang & Hale LLP (57) ABSTRACT The disclosed front end architectures are configured to conglomerate duplexer transmission (TX) contours into a specific or targeted region. This enables the power amplifier (PA) to match a larger number of frequency bands without the help of additional matching networks. The disclosed architectures are advantageous because they reduce the number of components (e.g., surface mount technology components (SMTs)) required for radio-frequency (RF) modules, such as front end modules, power amplifier modules, and the like. The disclosed architectures are also advantageous because they improve performance of the modules across a wider range of frequency bands.

17 Claims, 8 Drawing Sheets (56) References Cited

U.S. PATENT DOCUMENTS

| | | | |
|---|---|---|---|
| 2012/0306591 A1* | 12/2012 | Nishihara | H03H 9/173 |
| | | | 333/133 |
| 2015/0333781 A1* | 11/2015 | Alon | H03F 1/3247 |
| | | | 370/310 |
| 2017/0222672 A1* | 8/2017 | Khlat | H04B 1/0057 |
| 2019/0097606 A1* | 3/2019 | Nosaka | H04B 1/40 |
| 2020/0252054 A1* | 8/2020 | Takata | H03H 9/6483 |

OTHER PUBLICATIONS

International Search Report for PCT/US2021/065769, Apr. 27, 2022, in 3 pages.

* cited by examiner

CONGLOMERATING TRANSMISSION CONTOURS TO IMPROVE TRANSMISSION PERFORMANCE FOR RADIO-FREQUENCY COMMUNICATIONS

CROSS-REFERENCE TO RELATED APPLICATIONS

This application claims priority to U.S. Prov. App. Nos. 63/133,196 filed Dec. 31, 2020 and entitled "CONGLOMERATING TRANSMISSION CONTOURS TO IMPROVE TRANSMISSION PERFORMANCE FOR RADIO-FREQUENCY COMMUNICATIONS," and 63/281,365 filed Nov. 19, 2021 and entitled "REDUCING IMPEDANCE MATCHING COMPONENTS IN FRONT END ARCHITECTURES FOR MULTI-BAND TRANSMIT AND RECEIVE FUNCTIONS," each of which is expressly incorporated by reference herein in its entirety.

BACKGROUND

Field

The present disclosure generally relates to improving the performance of radio-frequency (RF) modules, such as front end modules, for RF communications.

Description of Related Art

Front end architectures in radio frequency devices are designed to receive and amplify signals in devices such as cellular phones. The performance of these architectures may be affected by a number of factors, including impedance matching. In a typical multi-band front end module (FEM), many impedance matching components are included to enable proper and efficient operation of each frequency band's transmit (TX) and receive (RX) functions. These impedance matching components are typically coupled to a duplexer at an antenna node, a TX node, and a RX node. Typical FEMs include at least one matching inductor at each antenna node and RX node of each duplexer, where a duplexer typically services a particular frequency band. For some frequency bands, a typical FEM may also include at least one matching inductor at the TX node and an additional matching inductor at the RX node of the corresponding duplexers. For example, in a 10-band low-band (LB) module, the total number of components used for impedance matching can be as high as 25 to 35 surface mount technology (SMT) components.

SUMMARY

According to a number of implementations, the present disclosure relates to a front end architecture. The front end architecture includes a plurality of duplexers, each duplexer configured to filter signals within a particular frequency range. The front end architecture includes a transmission switch coupled to the plurality of duplexers, the transmission switch configured to direct transmission signals to the plurality of duplexers. The front end architecture includes a plurality of power amplifiers coupled to the transmission switch and to the plurality of duplexers, each duplexer configured to conglomerate transmission signal contours within a target impedance zone.

In some embodiments, individual duplexers of the plurality of duplexers include a resonator tuned so that signals within the particular frequency range of that duplexer have a contour within the target impedance zone. In further embodiments, the tuned resonator is a first transmission resonator of the duplexer.

In some embodiments, the plurality of duplexers is configured to cover an aggregate frequency range that extends from at least 663 MHz to less than or equal to 915 MHz. In some embodiments, the plurality of duplexers is configured to cover an aggregate frequency range that includes frequency bands B8, B12, B13, B14, B20, B26, B28A, B28B, B71A, and B71B.

In some embodiments, there are no impedance matching components between the transmission switch and the plurality of duplexers. In further embodiments, there are no inductors between the transmission switch and the plurality of duplexers. In further embodiments, there are no capacitors between the transmission switch and the plurality of duplexers.

In some embodiments, the front end architecture further includes a shunt capacitor between a duplexer of the plurality of duplexers and the transmission switch, the shunt capacitor configured to rotate transmission signals of a particular frequency band into the target impedance zone. In further embodiments, fewer than all of the plurality of duplexers include a shunt capacitor between the transmission switch and the respective duplexer.

According to a number of implementations, the present disclosure relates to a radio-frequency (RF) front end module. The RF front end module includes a packaging substrate. The RF front end module includes a plurality of duplexers implemented on the packaging substrate, each duplexer configured to filter signals within a particular frequency range. The RF front end module includes a transmission switch implemented on the packaging substrate and coupled to the plurality of duplexers, the transmission switch configured to direct transmission signals to the plurality of duplexers. The RF front end module includes a plurality of power amplifiers implemented on the packaging substrate and coupled to the transmission switch and to the plurality of duplexers, each duplexer configured to conglomerate transmission signal contours within a target impedance zone.

In some embodiments, individual duplexers of the plurality of duplexers include a resonator tuned so that signals within the particular frequency range of that duplexer have a contour within the target impedance zone. In further embodiments, the tuned resonator is a first transmission resonator of the duplexer.

In some embodiments, there are no impedance matching components between the transmission switch and the plurality of duplexers. In further embodiments, there are no inductors between the transmission switch and the plurality of duplexers. In further embodiments, there are no capacitors between the transmission switch and the plurality of duplexers.

In some embodiments, the RF front end module further includes a shunt capacitor between a duplexer of the plurality of duplexers and the transmission switch, the shunt capacitor configured to rotate transmission signals of a particular frequency band into the target impedance zone. In further embodiments, fewer than all of the plurality of duplexers include a shunt capacitor between the transmission switch and the respective duplexer.

According to a number of implementations, the present disclosure relates to a wireless device. The wireless device includes a primary antenna. The wireless device includes a plurality of duplexers, each duplexer configured to filter signals within a particular frequency range. The wireless device includes a transmission switch coupled to the plurality of duplexers, the transmission switch configured to direct transmission signals to the plurality of duplexers. The wireless device includes a plurality of power amplifiers coupled to the transmission switch and to the plurality of duplexers, the plurality of power amplifiers configured to amplify transmission signals prior to transmission, each duplexer configured to conglomerate transmission signal contours within a target impedance zone. The wireless device includes a controller implemented to control the transmission switch and the plurality of power amplifiers to direct the transmission signals to the primary antenna.

In some embodiments, there are no impedance matching components between the transmission switch and the plurality of duplexers.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Overview

Described herein are front end architectures that conglomerate transmission contours to reduce or eliminate the number of components required for impedance matching. The disclosed front end architectures are configured to conglomerate transmission contours so that the power amplifiers (PAs) have a better or preferable (e.g., easier) impedance to match.

As used herein, transmission contours can include the contours of transmission signals plotted on a Smith chart. Thus, conglomerating transmission contours can include tailoring one or more components in the transmission signal path so that the contours of transmission signals, e.g., on a Smith chart, are grouped relatively tightly together. Tightly grouped transmission contours are advantageous because they are easier for a power amplifier to match across a wide range of frequency bands.

Figure 1:
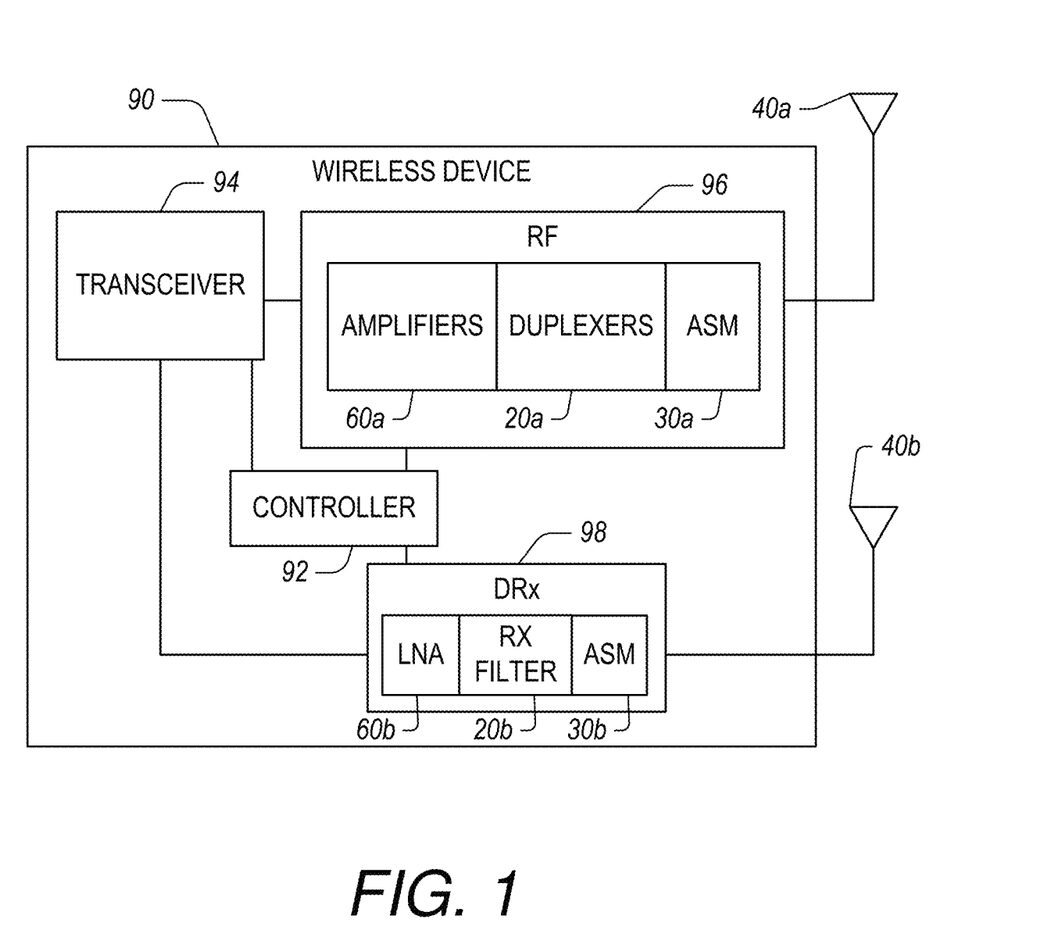
FIG. 1 illustrates a wireless device having a primary antenna and a diversity antenna.

FIG. 1 illustrates a wireless device 90 having a primary antenna 40a and a diversity antenna 40b. The wireless device 90 includes an RF module 96 and a transceiver 94 that may be controlled by a controller 92. The transceiver 94 is configured to convert between analog signals (e.g., radio-frequency (RF) signals) and digital data signals. To that end, the transceiver 94 may include a digital-to-analog converter, an analog-to-digital converter, a local oscillator for modulating or demodulating a baseband analog signal to or from a carrier frequency, a baseband processor that converts between digital samples and data bits (e.g., voice or other types of data), or other components.

The RF module 96 is coupled between the primary antenna 40a and the transceiver 94. Because the RF module 96 may be physically close to the primary antenna 40a to reduce attenuation due to cable loss, the RF module 96 may be referred to as a front-end module (FEM). The RF module 96 may perform processing on an analog signal received from the primary antenna 40a for the transceiver 94 or received from the transceiver 94 for transmission via the primary antenna 40a. To that end, the RF module 96 includes an antenna switch module (ASM) 30a, one or more duplexers 20a, one or more amplifiers 60a (including power amplifiers (PAs) and low noise amplifiers (LNAs)) and may also include amplifier switches, band select switches, attenuators, matching circuits, multiplexers, and other components. The ASM 30a may be connected to a plurality of duplexers 20a to enable operation across a plurality of frequency bands. A signal for transmission can be sent from the transceiver 94 through the RF module 96, being amplified by an amplifier 60a (e.g., a PA), filtered by a duplexer 20a, and coupled to the primary antenna 40a via the ASM 30a. A signal received at the antenna 140a can be sent through the RF module 96, being connected to a duplexer 20a via the ASM 30a, being filtered by the duplexer 20a, and being amplified by an amplifier 60a (e.g., a LNA) before being sent to the transceiver 94.

The controller 102 can be configured to generate and/or to send control signals to other components of the wireless device 100. The controller 102 can be configured to receive signals from other components of the wireless device 100 to process to determine control signals to send to other components. In some embodiments, the controller 102 can be configured to analyze signals or data to determine control signals to send to other components of the wireless device 100.

Because the diversity antenna 110b is physically spaced apart from the primary antenna 110a, the diversity antenna 110b can be coupled to the transceiver 104 by a transmission line, such as a cable or a printed circuit board (PCB) trace. In some implementations, gain is applied to the signal received at the diversity antenna 110b. The gain (and other analog processing, such as filtering) may be applied by the diversity receiver module 108. Because such a diversity receiver module 108 may be located physically close to the diversity antenna 110b, it may be referred to as a diversity receiver front-end module (DRx). The DRx module 108 includes components similar to the RF module 106, such as an ASM 120b, an RX filter 130b, and a LNA 140b.

The RF module 106 and the diversity receiver module 108 are examples of front end modules that may incorporate the front end architectures described herein. These FEMs may incorporate the configurations that enable the reduction of the number of impedance matching components in the front end. As described herein, the disclosed front end architectures enable the removal of many of the impedance matching components typically included in a transmit signal path between transmit amplifiers 60a and the antenna 40a.

Conglomerating Transmission Contours

In some embodiments, front end architectures are configured to conglomerate transmission contours to reduce or to eliminate the number of components required for impedance matching. The disclosed front end architectures are configured to conglomerate transmission contours so that the power amplifiers (PAs) have a better or preferable (e.g., easier) impedance to match.

Inside front end architectures where the PA is cascaded with follow-on components (e.g., a transmission or TX switch and several duplexers), the PA can only impedance match well to certain frequency bands due to its impedance being confined within a small range. To improve TX performance for a wider range of frequency bands, typically a TX matching network is included for each duplexer to transform the PA impedance for the power amplifier. By way of example, in a 10-band frond end module, if half of the frequency bands need this matching network, it will require an additional 5 to 10 extra SMTs to achieve that goal. This approach not only increases the cost of the module but it also makes it difficult to fit all these extra SMTs onto an already crowded module. Thus, the disclosed front end architectures reduce or eliminate the need for these SMTs, not only to achieve good electrical performance for all frequency bands, but to also reduce costs and to use less space.

Typically, front end architectures use several PAs such that each PA can match into a single frequency band. This method not only uses larger Heterojunction Bipolar Transistor (HBT) dies but also uses an impedance matching network for each band, which uses a lot of SMTs. Other approaches use two PAs with a switching option where the first PA matches certain frequencies or frequency bands and the second PA a slightly different frequency range. But this solution sometimes still needs additional matching components for certain frequency bands if the duplexer TX contour is shifted away from a suitable PA matching zone.

Accordingly, the disclosed front end architectures are configured to conglomerate duplexer TX contours into a specific or targeted region. This enables the PA to match a larger number of frequency bands without the help of additional matching networks. The disclosed architectures are advantageous because they reduce the number of SMTs required for radio-frequency (RF) modules, such as front end modules, power amplifier modules, and the like. The disclosed architectures are also advantageous because they improve performance of the modules across a wider range of frequency bands.

The disclosed architectures can be configured to conglomerate TX contours using a variety of methods. For example, the duplexers can be designed so that the resulting TX contour for each duplexer is within a target impedance zone. The target impedance zone can be one that enables superior operation of the PA. In addition, where duplexers are limited and/or cannot be designed so that the resulting TX contour is within the target impedance zone, a shunt capacitor can be used to move the TX contour to the target impedance zone. These shunt capacitors can be preferable to other SMT capacitors because the shunt capacitors can be realized and integrated at the output of the TX switch for these particular frequency bands. The disclosed architectures advantageously achieve similar or superior performance to architectures that use more components for impedance matching. Thus, the disclosed architectures achieve comparable performance with reduced cost and complexity. In addition, the disclosed architectures advantageously free up space on the module for other components or to allow the size of the module to be reduced. Decreasing the size of the module advantageously further reduces costs.

The disclosed architectures advantageously remove the need for matching networks and save on costs by removing SMTs that would otherwise be included for impedance matching. As a particular example, the disclosed architectures can enable the removal of between 5-10 SMTs from a module. Likewise, the disclosed architectures require less space due to the removal of unnecessary SMTs. The disclosed architectures can be applied to various PA architectures such as class E, class AB, pull-pull, or the like.

Figure 2:
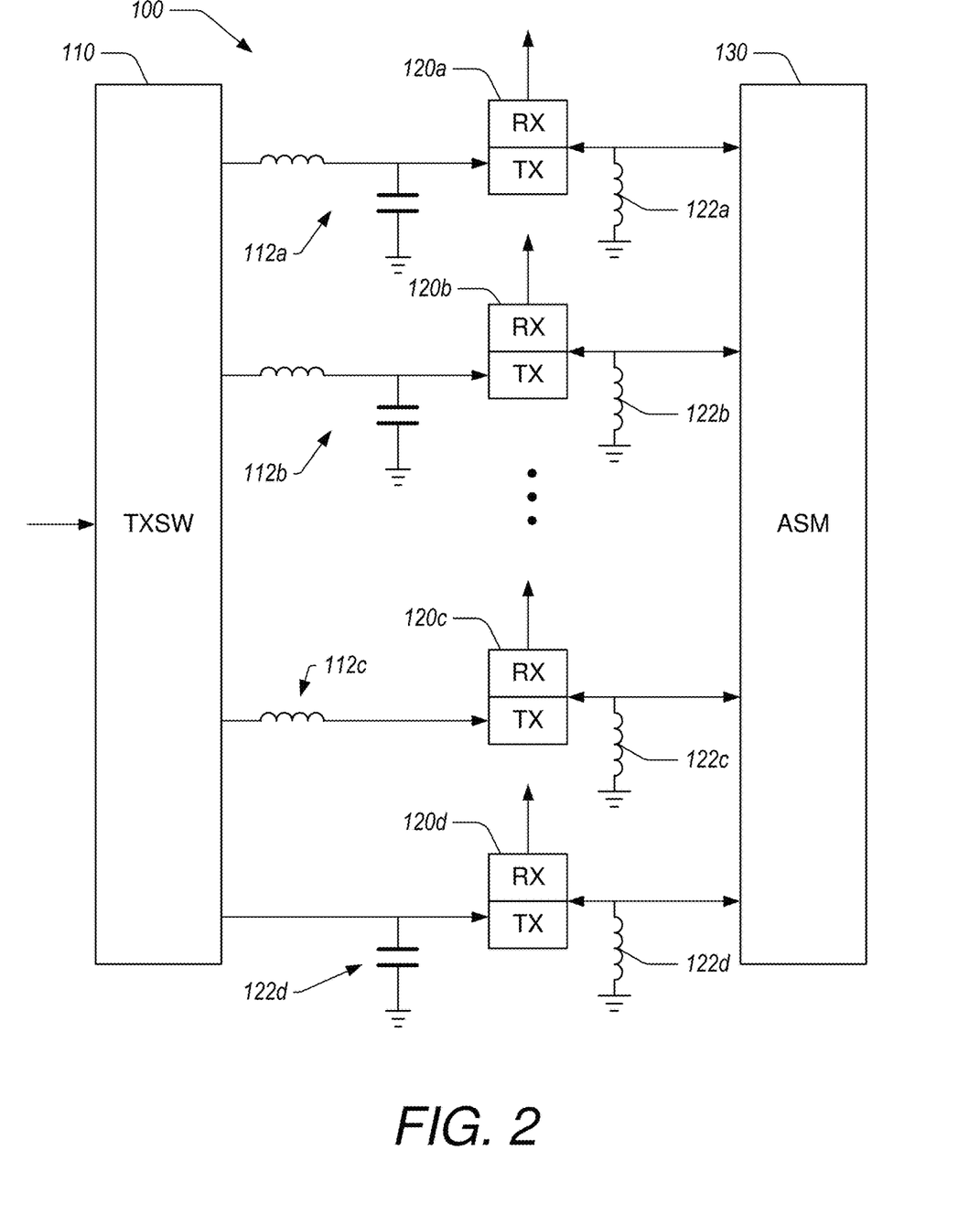
FIG. 2 illustrates a traditional approach to impedance matching in a front end architecture.

FIG. 2 illustrates a traditional approach to impedance matching in a front end architecture 100. The front end architecture 100 includes a transmission switch 110 that directs transmission signals through matching networks 112a-112d to duplexers 120a-120d. The front end architecture 100 includes shunt inductors 122a-122d between the duplexers 120a-120d and an antenna switch module (ASM) 130. The matching networks 112a-112d include inductors, shunt capacitors, or a combination of inductors and shunt capacitors.

Figure 3:
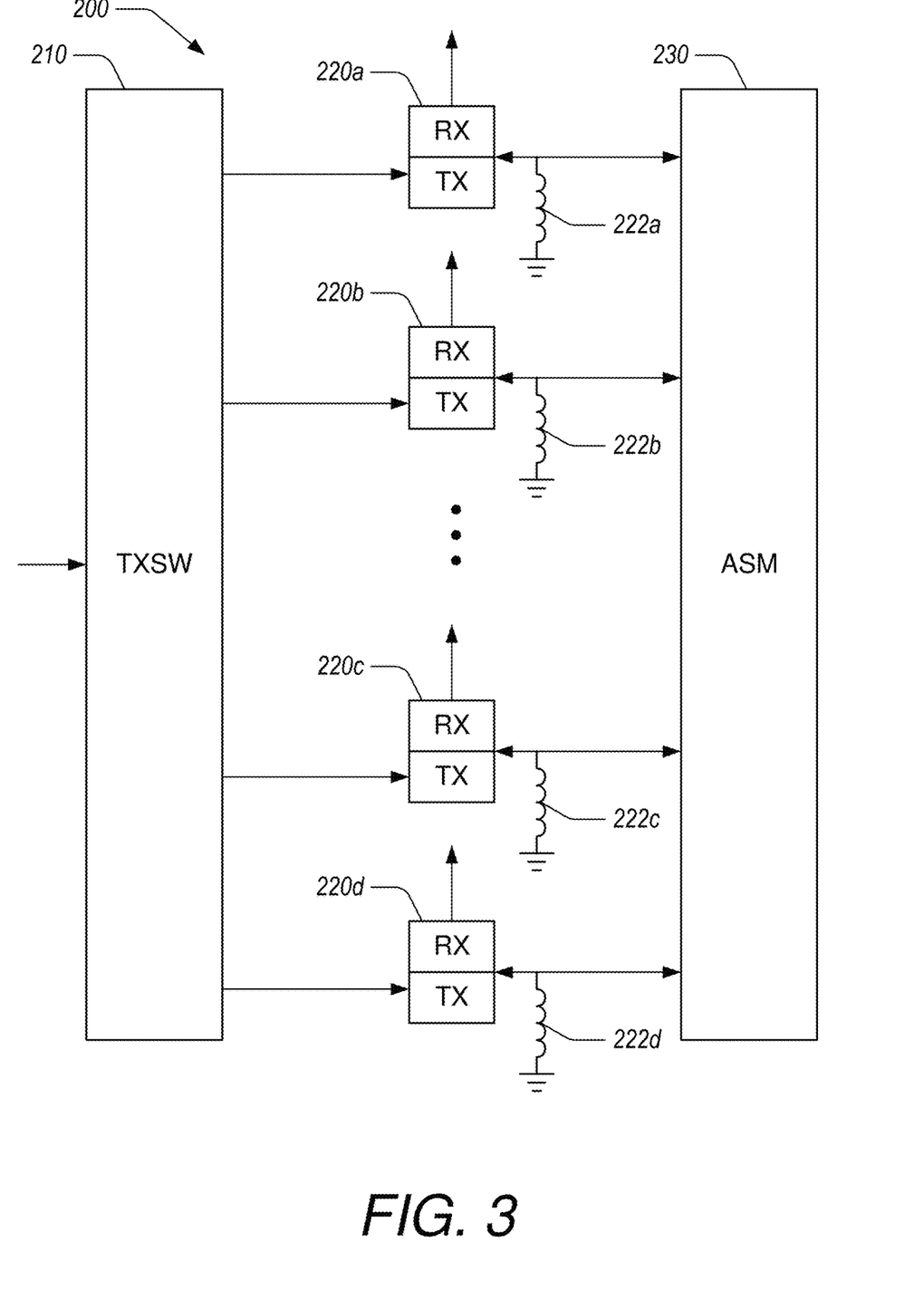
FIG. 3 illustrates an example embodiment of a front end architecture that enables the removal of the matching networks of the front end architecture of FIG. 2.

In comparison, FIG. 3 illustrates an example embodiment of a front end architecture 200 that enables the removal of the matching networks 112a-112d of the front end architecture 100 of FIG. 2. Between the transmission switch 210 and the duplexers 220a-220d, there are no inductors. Thus, the front end architecture 200 enables the removal of all TX matching networks at the duplexer TX input. In some embodiments, the front end architecture 200 does not include any impedance matching components between the transmission switch 210 and the duplexers 220a-220d. In certain implementations, the front end architecture 200 does not include any inductors between the transmission switch 210 and the duplexers 220a-220d, but may include one or more shunt capacitors. In such implementations, fewer than all of the duplexers 220a-220d have a shunt capacitor between the transmission switch 210 and the respective duplexer 220a-220d (an example of which is described with respect to FIG. 5). In certain implementations, the front end architecture 200 does not include any capacitors between the transmission switch 210 and the duplexers 220a-220d.

In the traditional approach (e.g., the front end architecture of FIG. 1), a typical module would include a total of about 14 TX matching SMTs as part of the package. With the disclosed approach (e.g., the front end architecture of FIG. 2), a module would remove the 14 TX matching SMTs, resulting in a significant cost saving, reduction in complexity, and reduction in required space on the module.

Figure 4A:
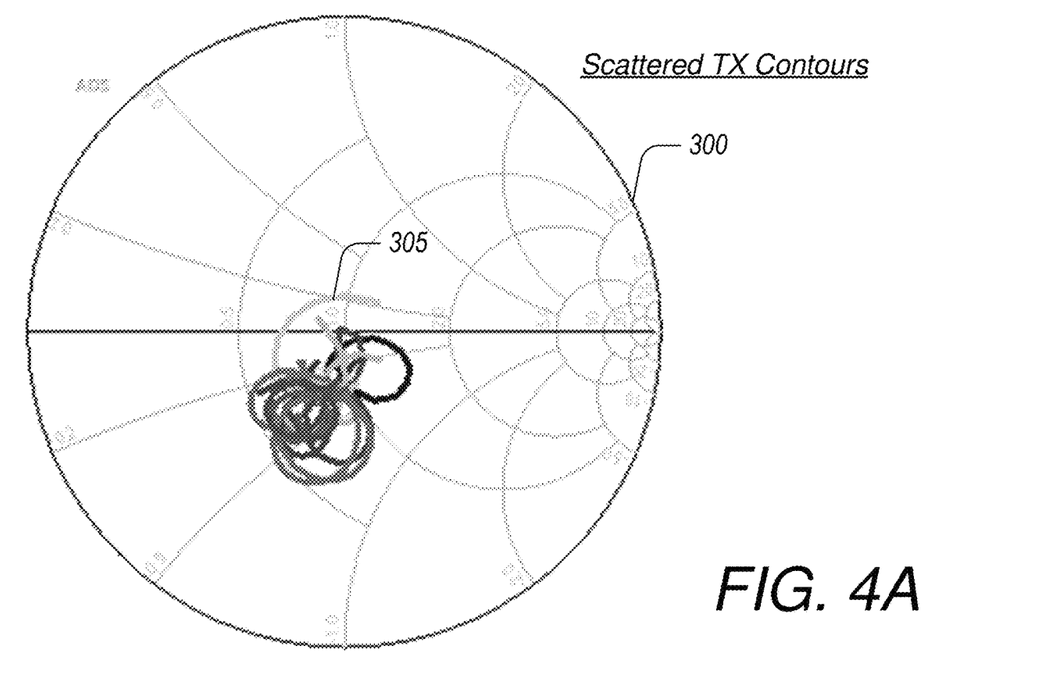
FIG. 4A illustrates TX contours on a Smith chart for a typical front end architecture (e.g., the front end architecture 100 of FIG. 2).

FIG. 4A illustrates TX contours 305 on a Smith chart 300 for a typical front end architecture (e.g., the front end architecture 100 of FIG. 2). The TX contours 305 are scattered and are difficult to impedance match for the power amplifiers. Thus, some frequency bands may be impedance matched while others are not. This results in the addition of impedance matching components, such as the impedance matching networks 112a-112d.

Figure 4B:
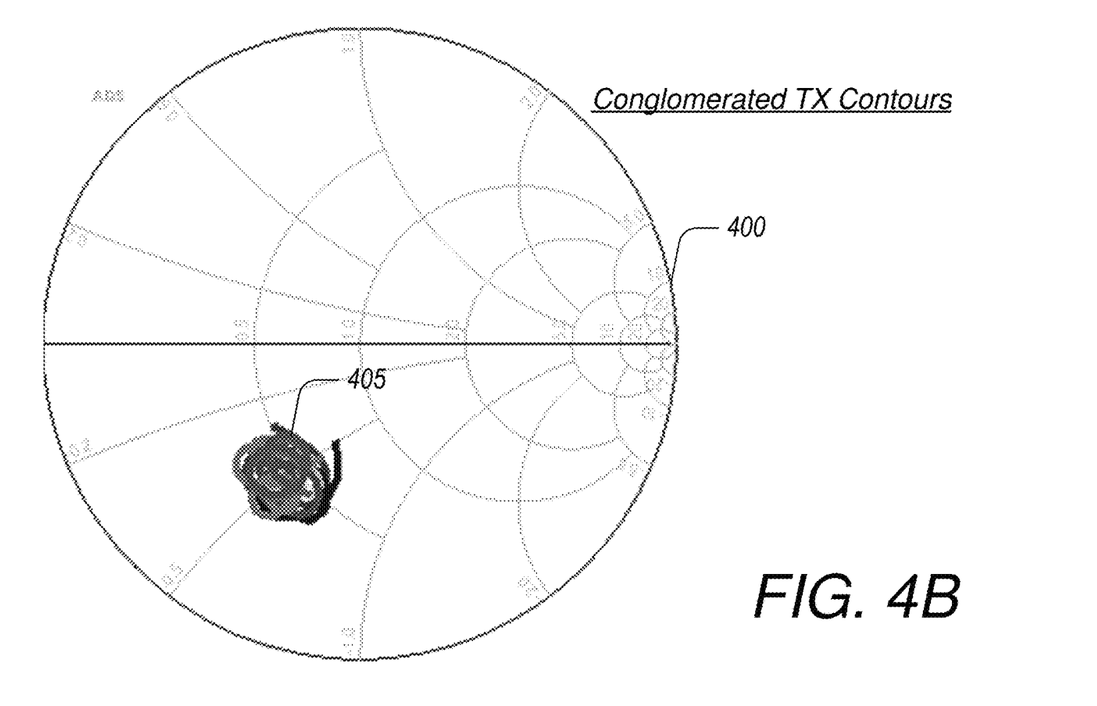
FIG. 4B illustrates TX contours on a Smith chart for the front end architectures disclosed herein (e.g., the front end architecture of FIG. 3).

In contrast, FIG. 4B illustrates TX contours 405 on a Smith chart 400 for the front end architectures disclosed herein (e.g., the front end architecture 200 of FIG. 3). The TX contours 405 are conglomerated providing a better impedance for the power amplifier to match.

In the plots of FIGS. 4A and 4B, the frequencies of the signals range from 663 MHz to 915 MHz. The frequency bands of the TX contours correspond to frequency bands B8, B12, B13, B14, B20, B26, B28A, B28B, B71A, B71B.

Thus, the disclosed front end architectures conglomerate duplexer TX contours into a target impedance zone so that the PA can match to all frequency bands of the front end architecture without additional matching components prior to the duplexers.

Figure 5:
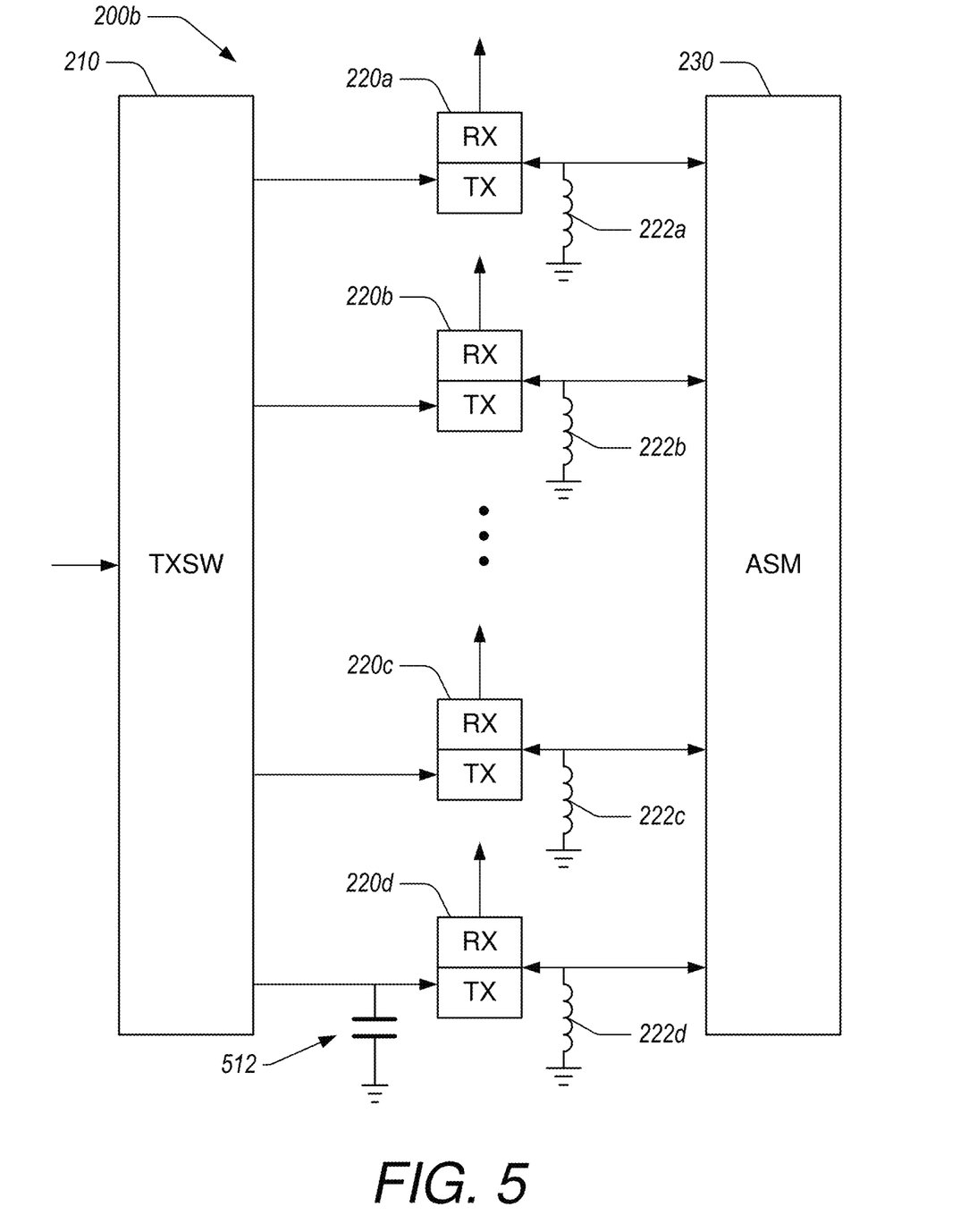
FIG. 5 illustrates an example front end architecture that is identical to the front end architecture of FIG. 3 with the addition of a shunt capacitor for a particular frequency band.

FIG. 5 illustrates an example front end architecture 200b that is identical to the front end architecture 200 of FIG. 3 with the addition of a shunt capacitor 512 for a particular frequency band. In some embodiments, some frequency bands may be problematic for a duplexer to rotate into the target impedance zone. For these frequency bands, the shunt capacitor 512 can be added at the output of the TX switch 210. Additional shunt capacitors can be added in the same way for other frequency bands to rotate the TX contours of these frequency bands into the target impedance zone. In some embodiments, fewer than all of the duplexers 120a-120d include such a shunt capacitor.

The TX filter of the duplexer is the load that the PA sees, so the disclosed front end architectures use duplexers that present a load that is compatible with the PA. Because the duplexers present this targeted load, the need for additional matching components is reduced or eliminated.

Accordingly, each duplexer of the disclosed front end architectures is configured to filter signals within a particular frequency range and to present a targeted load to the PA associated with the duplexer. The front end architectures can include a plurality of power amplifiers coupled to the transmission switch and to the plurality of duplexers, each duplexer configured to conglomerate transmission signal contours within a target impedance zone.

Figure 6:
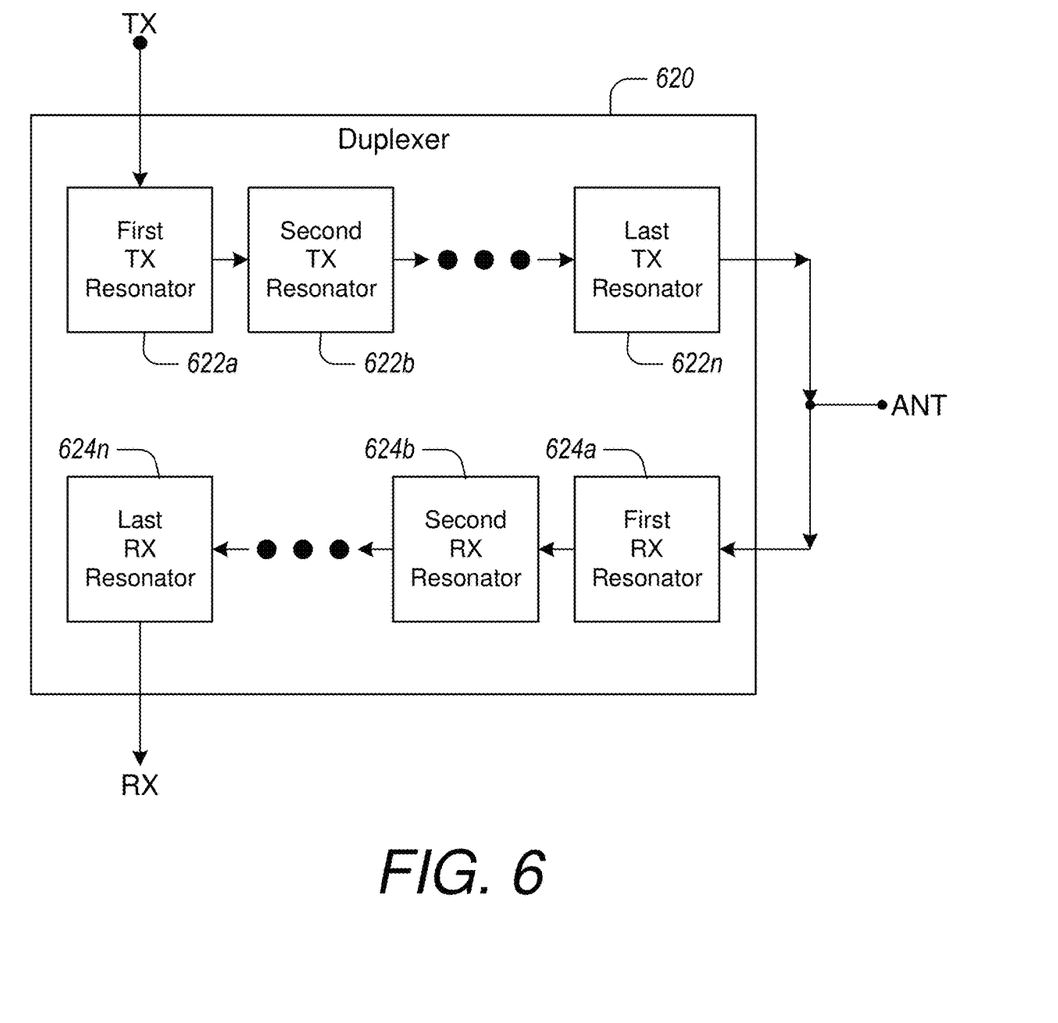
FIG. 6 illustrates an example duplexer that enables the disclosed front end architectures to remove certain matching networks between the TX switch and the duplexers.

FIG. 6 illustrates an example duplexer 620 that enables the disclosed front end architectures to remove certain matching networks between the TX switch and the duplexers. The duplexer 620 adjusts characteristics of the TX resonators 622a to 622n between the antenna (ANT) and the TX ports. In some embodiments, the first TX resonator 622a is adjusted to achieve a desired impedance location for the TX contours. In some embodiments, the duplexer 620 comprises SAW resonators and/or acoustic filters.

Accordingly, the disclosed front end architectures include duplexers that have resonators that have been configured to present a targeted impedance for the PA to enable the removal of matching networks between the duplexers and the TX switch. Each duplexer is thus tuned for an individual frequency band or a particular frequency range. Thus, the duplexers of the disclosed front end architectures have custom-tuned impedances.

EXAMPLES OF PRODUCTS AND ARCHITECTURES

Figure 7:
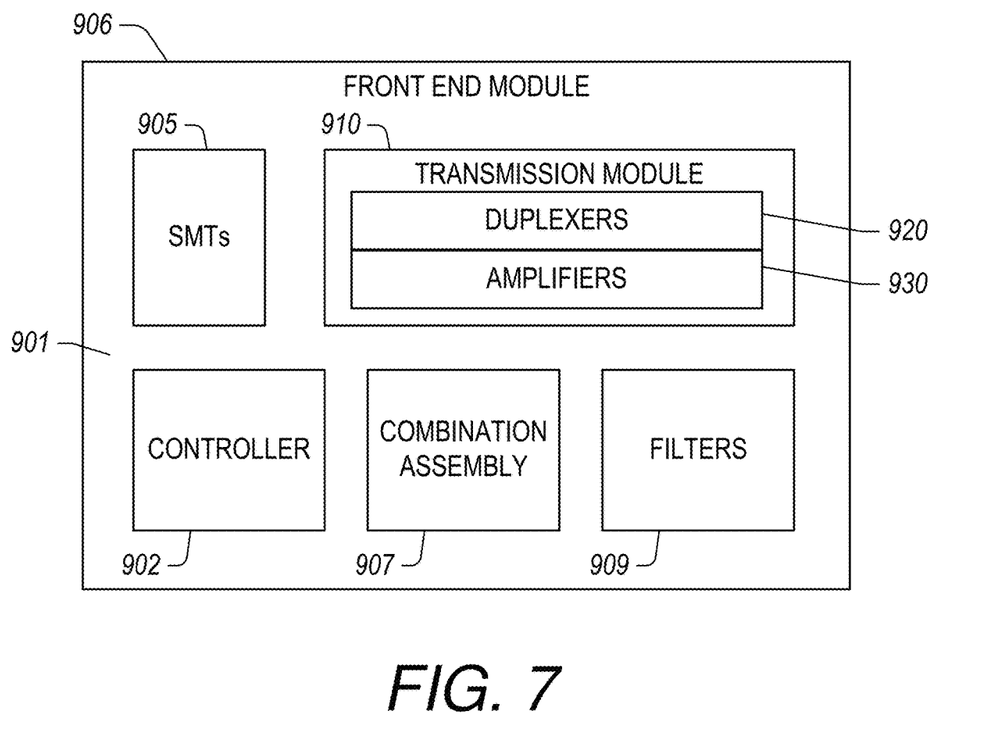
FIG. 7 illustrates a module that incorporates some or all of the configurations described herein.

FIG. 7 illustrates that in some embodiments, some or all of the amplifier configurations, including some or all of the amplifier configurations having the combinations of features described herein (e.g., FIGS. 2-6), can be implemented, wholly or partially, in a module. Such a module can be, for example, a front-end module (FEM). Such a module can be, for example, a multi-input, multi-output (MiMo) module.

In the example of FIG. 7, a module 906 can include a packaging substrate 901, and a number of components can be mounted on such a packaging substrate 901. For example, a controller 902 (which may include a front-end power management integrated circuit [FE-PIMC]), a combination assembly 907, a variable gain amplifier assembly 910 that includes duplexers 920 and amplifiers 930 having one or more features as described herein, and a filter bank 909 (which may include one or more bandpass filters) can be mounted and/or implemented on and/or within the packaging substrate 901. Other components, such as a number of SMT devices 905, can also be mounted on the packaging substrate 901. Although all of the various components are depicted as being laid out on the packaging substrate 901, it will be understood that some component(s) can be implemented over other component(s).

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 8:
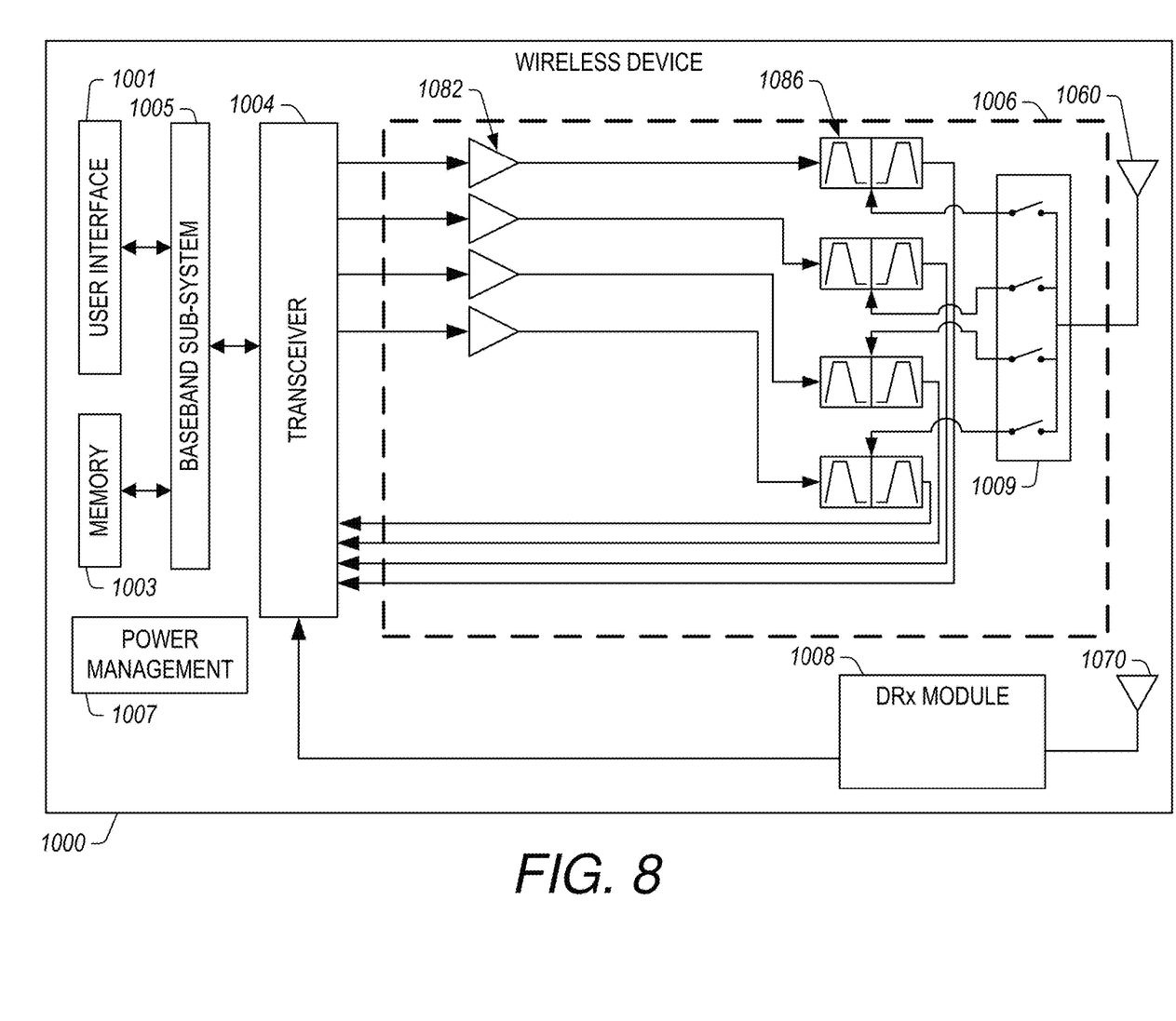
FIG. 8 illustrates a wireless device that incorporates some or all of the configurations described herein.

FIG. 8 depicts an example wireless device 1000 having one or more advantageous features described herein. In the context of one or more modules having one or more features as described herein, such modules can be generally depicted by a dashed box 1006 (which can be implemented as, for example, a front-end module) and a diversity receiver (DRx) module 1008 (which can be implemented as, for example, a front-end module).

Referring to FIG. 8, power amplifiers (PAs) 1082 can receive their respective RF signals from a transceiver 1004 that can be configured and operated to generate RF signals to be amplified and transmitted, and to process received signals. The transceiver 1004 is shown to interact with a baseband sub-system 1005 that is configured to provide conversion between data and/or voice signals suitable for a user and RF signals suitable for the transceiver 1004. The transceiver 1004 can also be in communication with a power management component 1007 that is configured to manage power for the operation of the wireless device 1000. Such power management can also control operations of the baseband sub-system 1005 and the modules 1006 and 1008.

The baseband sub-system 1005 is shown to be connected to a user interface 1001 to facilitate various input and output of voice and/or data provided to and received from the user. The baseband sub-system 1005 can also be connected to a memory 1003 that is configured to store data and/or instructions to facilitate the operation of the wireless device, and/or to provide storage of information for the user.

In the example wireless device 1000, outputs of the PAs 1082 are shown to be routed to their respective duplexers 1086. The duplexers 1086 can be configured as described herein to conglomerate TX contours to remove matching components between the PAs 1082 and the duplexers 1086. Such amplified and filtered signals can be routed to a primary antenna 1060 through a switching network 1009 for transmission. In some embodiments, the duplexers 1086 can allow transmit and receive operations to be performed simultaneously using a common antenna (e.g., primary antenna 1060). In FIG. 7, received signals are routed to low-noise amplifiers (not shown).

The wireless device also includes a diversity antenna 1070 and a diversity receiver module 1008 that receives signals from the diversity antenna 1070. The diversity receiver module 1008 processes the received signals and transmits the processed signals to the transceiver 1004. In some embodiments, a diplexer, triplexer, or other multiplexer or filter assembly can be included between the diversity antenna 1070 and the diversity receiver module 1070, as described herein.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1. It is to be understood that the term radio frequency (RF) and radio frequency signals refers to signals that include at least the frequencies listed in Table 1.

TABLE 1

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |
| B45 | TDD | 1,447-1,467 | 1,447-1,467 |
| B46 | TDD | 5,150-5,925 | 5,150-5,925 |
| B65 | FDD | 1,920-2,010 | 2,110-2,200 |
| B66 | FDD | 1,710-1,780 | 2,110-2,200 |
| B67 | FDD | N/A | 738-758 |
| B68 | FDD | 698-728 | 753-783 |
| B71 | FDD | 663-698 | 617-652 |

ADDITIONAL EMBODIMENTS AND TERMINOLOGY

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A front end architecture comprising:
   a plurality of duplexers, each duplexer configured to filter signals within a particular frequency range such that the front end architecture amplifies signals across a broad frequency range spanning the individual frequency ranges of the plurality of duplexers;

a transmission switch coupled to the plurality of duplexers, the transmission switch configured to direct transmission signals to the plurality of duplexers; and a single power amplifier that amplifies signals across the broad frequency range, the single power amplifier coupled to the transmission switch upstream of the plurality of duplexers, each duplexer configured to conglomerate transmission signal contours within a target impedance zone, the target impedance zone impedance configured to impedance match the single power amplifier, wherein there are no impedance matching components between the transmission switch and the plurality of duplexers.

2. The front end architecture of claim 1 wherein individual duplexers of the plurality of duplexers include a resonator tuned so that signals within the particular frequency range of that duplexer have a contour within the target impedance zone.

3. The front end architecture of claim 2 wherein the tuned resonator is a first transmission resonator of the duplexer.

4. The front end architecture of claim 1 wherein the plurality of duplexers are configured to cover an aggregate frequency range that extends from at least 663 MHz to less than or equal to 915 MHz.

5. The front end architecture of claim 1 wherein the plurality of duplexers are configured to cover an aggregate frequency range that includes frequency bands B8, B12, B13, B14, B20, B26, B28A, B28B, B71A, and B71B.

6. The front end architecture of claim 1 wherein there are no inductors between the transmission switch and the plurality of duplexers.

7. The front end architecture of claim 1 wherein there are no capacitors between the transmission switch and the plurality of duplexers.

8. The front end architecture of claim 1 further comprising a shunt capacitor between a duplexer of the plurality of duplexers and the transmission switch, the shunt capacitor configured to rotate transmission signals of a particular frequency band into the target impedance zone.

9. The front end architecture of claim 8 wherein fewer than all of the plurality of duplexers include a shunt capacitor between the transmission switch and the respective duplexer.

10. A radio-frequency (RF) front end module comprising:
a packaging substrate; a plurality of duplexers implemented on the packaging substrate, each duplexer configured to filter signals within a particular frequency range such that the front end architecture amplifies signals across a broad frequency range spanning the individual frequency ranges of the plurality of duplexers;

a transmission switch implemented on the packaging substrate and coupled to the plurality of duplexers, the transmission switch configured to direct transmission signals to the plurality of duplexers; and a single power amplifier that amplifies signals across the broad frequency range, the single power amplifier implemented on the packaging substrate and coupled to the transmission switch upstream of the plurality of duplexers, each duplexer configured to conglomerate transmission signal contours within a target impedance zone, the target impedance zone impedance configured to impedance match the single power amplifier, wherein there are no impedance matching components between the transmission switch and the plurality of duplexers.

11. The RF front end module of claim 10 wherein individual duplexers of the plurality of duplexers include a resonator tuned so that signals within the particular frequency range of that duplexer have a contour within the target impedance zone.

12. The RF front end module of claim 11 wherein the tuned resonator is a first transmission resonator of the duplexer.

13. The RF front end module of claim 10 wherein there are no inductors between the transmission switch and the plurality of duplexers.

14. The RF front end module of claim 10 wherein there are no capacitors between the transmission switch and the plurality of duplexers.

15. The RF front end module of claim 10 further comprising a shunt capacitor between a duplexer of the plurality of duplexers and the transmission switch, the shunt capacitor configured to rotate transmission signals of a particular frequency band into the target impedance zone.

16. The RF front end module of claim 15 wherein fewer than all of the plurality of duplexers include a shunt capacitor between the transmission switch and the respective duplexer.

17. A wireless device comprising:
a primary antenna; a plurality of duplexers, each duplexer configured to filter signals within a particular frequency range such that the front end architecture amplifies signals across a broad frequency range spanning the individual frequency ranges of the plurality of duplexers;

a transmission switch coupled to the plurality of duplexers, the transmission switch configured to direct transmission signals to the plurality of duplexers;

a single power amplifier that amplifies signals across the broad frequency range, the single power amplifier coupled to the transmission switch upstream of the plurality of duplexers, the plurality of power amplifiers configured to amplify transmission signals prior to transmission, each duplexer configured to conglomerate transmission signal contours within a target impedance zone, the target impedance zone impedance configured to impedance match the single power amplifier; and a controller implemented to control the transmission switch and the plurality of power amplifiers to direct the transmission signals to the primary antenna, wherein there are no impedance matching components between the transmission switch and the plurality of duplexers.

* * * * *